(12) United States Patent
Ebbesmeier

(10) Patent No.: US 7,057,830 B2
(45) Date of Patent: Jun. 6, 2006

(54) HIGH-APERTURE WIDE ANGLE CINEMA PROJECTION LENS

(75) Inventor: Hildegard Ebbesmeier, Schweppenhausen (DE)

(73) Assignee: Jos. Schneider Optische Werke GmbH, Bad Kreuznach (DE)

( * ) Notice: Subject to any disclaimer, the term of this patent is extended or adjusted under 35 U.S.C. 154(b) by 0 days.

(21) Appl. No.: 10/995,484

(22) Filed: Nov. 24, 2004

(65) Prior Publication Data

US 2005/0117225 A1    Jun. 2, 2005

(30) Foreign Application Priority Data

Nov. 28, 2003  (DE) ................. 103 56 338

(51) Int. Cl.
*G02B 9/64* (2006.01)
(52) U.S. Cl. ....................... 359/755; 359/754
(58) Field of Classification Search ................ 359/649, 359/749–751, 754, 755, 761
See application file for complete search history.

(56) References Cited

U.S. PATENT DOCUMENTS 5,798,874 A * 8/1998 Yamamoto ............. 359/761

6,437,926 B1 * 8/2002 Mori ..................... 359/755
6,795,255 B1    9/2004 Reinecke et al.

FOREIGN PATENT DOCUMENTS

| DE | 24 36 444 A1 | 2/1976 |
|---|---|---|
| DE | 36 33 032 A1 | 6/1987 |
| DE | 42 12 067 A1 | 10/1993 |
| EP | 1134 606 A1 | 4/2002 |
| EP | 1 215 519 A1 | 6/2002 |
| EP | 1 489 451 A | 12/2004 |
| GB | 2 185 128 A | 7/1987 |
| JP | 2002341242 | 11/2002 |

* cited by examiner

*Primary Examiner*—Hung Xuan Dang
*Assistant Examiner*—Joseph Martinez
(74) *Attorney, Agent, or Firm*—Buchanan Ingersoll PC

(57) ABSTRACT

A projection lens with a short focal length and high initial aperture is proposed. Such projection lenses are used, for example, in cinema projection. The projection lens is configured such that the sum of the overall length and the back focus (12) is between 2.8 times and 4.5 times the total focal length f'. The entrance pupil is at a distance of between 100 mm and 300 mm from the last lens surface (62; 150), which faces the illuminating mirror. The minimum stop number k of the projection lens is 1.7, and the projection lens is therefore also suitable for illuminating mirrors with a high aperture angle (of up to 17°).

9 Claims, 10 Drawing Sheets

HIGH-APERTURE WIDE ANGLE CINEMA PROJECTION LENS

FIELD OF THE INVENTION

The invention relates to a high-aperture projection lens with focal lengths of shorter than 50 mm. The main field of application of the invention is 35 mm cinema projection.

PRIOR ART

Projection lenses for projecting cinema images must fulfil a range of technical boundary conditions which influence the selection and arrangement of the optical elements. In addition to a high luminosity, good imaging quality and high depth of focus, there is also a need to fulfil installation conditions. These installation conditions relate, for example, to the spatial restrictions, prescribed by commercial cinema projectors, on the space available for the projection lens. Thus, the diameters of the optical elements used, the housing of the projection lens and the back focus, that is to say the distance of the last lens surface from the film plane, must satisfy the installation conditions.

Wide-angled projection lenses are generally required for small cinema auditoria with large projection screens, or for back projection. In many instances, the total focal length of the projection lens is shorter than the back focus prescribed by the installation conditions. Such projection lenses are denoted as retrofocus projection lenses.

In addition to optical aberrations, many projection lenses exhibit problems with the uniform illumination of the image and with the luminosity of the arrangement. A measure of the luminosity of the projection lens is the so-called stop number k, which is calculated from the total focal length f' of the projection lens and the diameter of the entrance pupil $D_{EP}$ in accordance with $$k = f'/D_{EP} \quad (1)$$

The entrance pupil $D_{EP}$ is defined here as that aperture of the projection lens which a viewer perceives from the direction of the film. As a rule, this is the image of a diaphragm within the projection lens. A large aperture $D_{EP}$ therefore effects a small stop number k and vice versa.

However, at the same time the light source used for the projection also has a specific stop number $k_{SP}$. If, for example, a parabolic or spherical mirror with a focal length $f_{SP}$ and edge diameter $D_{SP}$ is used for the illumination, a stop number $k_{SP}$ of the mirror can be calculated from the ratio of the two variables. In the ideal case, the stop number of the projection lens is adapted to the stop number of the mirror in order to avoid light forces in the projection lens (excessively small aperture) or unsatisfactory illumination (excessively large aperture).

EP 1 134 606 B1 describes a projection lens which is constructed from at least seven lenses adjoined by air on both sides. The projection lens has a stop number of 1.9 and is characterized by an arrangement of lenses of which the first lens, as viewed from the image side, is configured as a positive lens.

OBJECT

It is an object of the invention to specify a projection lens with an excellent imaging performance,
  which fulfils the commercial installation conditions,
  which has a focal length of between 28.0 and 47.5 mm, and
  whose stop number k is adapted to the stop number of high-aperture illuminating mirrors.

SUMMARY OF THE INVENTION

This object is achieved by means of the invention having the features of the independent claim. Advantageous developments of the invention are characterized in the subclaims.

A projection lens is proposed which is suitable for projecting a film onto a projection screen and which has the following elements when viewed from the projection screen in the specified sequence:
  a first negative lens,
  a second positive lens,
  a third biconvex lens,
  a fourth biconcave lens,
  a fifth biconcave lens,
  a sixth biconvex lens, and
  a seventh biconvex lens.

This is a wide-angled projection lens, that is to say the total focal length f' of the projection objective is to fulfil the condition $$28 \text{ mm} \leq f' \leq 47.5 \text{ mm} \quad (2)$$

The projection lens is configured as a lightweight retrofocus projection lens in order to achieve the back focus required for cinema projection for the wide-angled projection lens. This is achieved by means of the first two lenses, which have a negative focal length overall. Furthermore, the smallest stop number $k_{min}$ of the projection lens is to be 1.8 or less (that is to say $k_{min} \leq 1.8$).

The optical elements typically consist of the glasses or plastics customary for the construction of projection lenses; these are selected with regard to their refractive index and their dispersion properties. In addition, the optical elements are suitably coated for antireflection.

The proposed projection lens has the advantage that it is also suitable for projectors with high-aperture illuminating mirrors (for example with a mirror stop number $k_{SP}$ of 1.7), since the aperture angle u of the projection lens can be adapted to the aperture angle α of the illuminating mirrors. As a result, the light emerging from the illuminating mirror is used in an optimum fashion. At the same time, the projection lens has a relatively long back focus.

The described design of the projection lens can be further improved by means of a range of optional additional features in its optical properties. These optional additional features will be described below.

In order to achieve an optimum correction of the spherical aberration, in particular for the small stop number of k=1.7, at least one lens of the projection lens must have an aspheric surface. It has proved to be advantageous in this regard when the surface, facing the third biconvex lens, of the second positive lens is configured as an aspheric surface.

For reasons of production engineering, it is expedient if the aspheric surface deviates from a spherical surface by not more than 10 μm. The slight deviation of the surface from the spherical shape (as a rule, merely 4–7 μm) permits a cost effective production method. Moreover, it is thereby possible for the optical quality testing of the surface to be greatly simplified, since testing the surface with the aid of expensive holograms can be eliminated.

Furthermore, it has proved to be advantageous to select the type and arrangement of the lenses such that the entrance pupil is arranged on the projection screen side at a distance of between 100 mm and 300 mm from the lens surface of the projection lens which is arranged furthest on the film side.

In this case, the first negative lens of the projection lens is arranged on the projection screen side and the seventh biconvex lens is arranged on the film side. The entrance pupil is defined in this case as that aperture of the projection lens which a fictitious observer positioned on the film side perceives.

This development has the advantage that the projected image can also be optimally illuminated in its edge regions. If the entrance pupil is arranged nearer than at a distance of 100 mm, a beam, emanating from an outer pixel, on the same side of the optical axis as the pixel is cut by the entrance pupil on its side situated at a distance from the optical axis. Light losses thereby occur. On the other hand, if the entrance pupil is arranged at a distance of more than 300 mm, the same beam on the side of the optical axis opposite the pixel is cut by the entrance pupil on its side situated at a distance from the optical axis.

A further advantageous refinement of the projection lens relates to the installation conditions. The diameters of the projection lens must be configured to be so small that the projection lens can be used for all current cinema projectors. The spatial dimensions of the projection lens are therefore advantageously designed in such a way that it can be installed for operating purposes in a space having the following dimensions:

the space is designed to be rotationally symmetrical about the optical axis;

it starts in a first plane, which is designed perpendicular to the optical axis and is arranged at a distance of 30 mm from the film plane;

on the projection screen side the first plane is adjoined by a first cylindrical volume with a diameter of 40 mm and a height of 8 mm;

the first cylindrical volume adjoined on the projection screen side by a second cylindrical volume with a diameter of 46 mm and a height of 15 mm; and the second cylindrical volume is adjoined on the projection screen side by a third cylindrical volume with a diameter of 70.65 mm.

The installation conditions of known manufacturers of cinema projectors are fulfilled by this development.

A further improvement of the projection lens can be achieved by designing the projection lens in such a way that the following condition is fulfilled between the overall length Sumd, the back focus S'F' and the total focal length f' of the projection lens:

$$2.8f' < Sumd + S'F' < 4.5f' \quad (3)$$

Here, the overall length Sumd denotes the distance between the first lens surface on the projection screen side and the last lens surface on the film side.

The condition (3) represents the result of optimization between uniform illumination of the image and an excessively large overall length. For the case in which $$Sumd + S'F' \leq 2.8f' \quad (4)$$

light losses, and thus losses in the luminosity of the projection lens would occur because of insufficient lumination and/or excessively strong vignetting. Furthermore, for excessively small back focuses the distance between the projection lens and film plane would be prescribed to be smaller than by the installation conditions. For the case in which $$Sumd + S'F' \geq 4.5f' \quad (5)$$

by contrast, it would be necessary to use excessively thick and expensive lens systems such that the transmission of the overall system, and thus the luminosity, are reduced.

In a development, the projection lens has a diaphragm, in particular a variable diaphragm, between the second positive lens and the third biconvex lens. This has the advantage that a greater depth of focus can be achieved, if desired, by stopping down. This is advantageous with curved cinema projection screens, in particular, in the case of which losses of definition would occur for an excessively small depth of focus at the edge of the image. Furthermore, in the case of extreme thermal action of the light source the film itself can also be curved more strongly than usual, and this likewise necessitates a greater depth of focus. Moreover, upon switching over between different cinema formats it is possible for differences in brightness to occur which can also be evened out by the use of a variable diaphragm.

The diaphragm is preferably arranged at a point at which all beams emanating from the image have a symmetrical cross section with reference to the optical axis. This ensures that no additional edge effects and vignetting occur owing to the diaphragm.

If, as described above, an aspheric surface is used to correct aberrations, it is expedient to arrange the aspheric surface on a surface adjacent to the diaphragm. The aspheric surface then permits optimum correction of the spherical aberrations in conjunction with a high stop number of the projection lens.

A further advantageous refinement relates to a series of projection lenses of the type described with different focal lengths, which is constructed according to the "module principle". The series of projection lenses is constructed in this case such that at least 2 projection lenses of different focal lengths have at least one lens which corresponds with regard to material thickness, and radii of curvature and/or shape of the aspheric surface.

It is possible here for individual lenses to correspond identically, or the carrier lens of two aspheric lenses can be identical (in which case the aspheric surface itself can have differences), or an identical aspheric surface can be applied to different carrier lenses. This development reduces the costs of production and storage considerably.

BRIEF DESCRIPTION OF THE DRAWINGS

The invention is explained in more detail below with the aid of exemplary embodiments which are illustrated diagrammatically in the figures. However, the invention is not restricted to the examples. Identical reference numerals in the individual figures here denote identical or functionally identical elements, or elements corresponding to one another with regard to their functions. In detail.

The technical data of the exemplary embodiments illustrated in the figures are listed in Tables 1 to 4.

Figure 2:
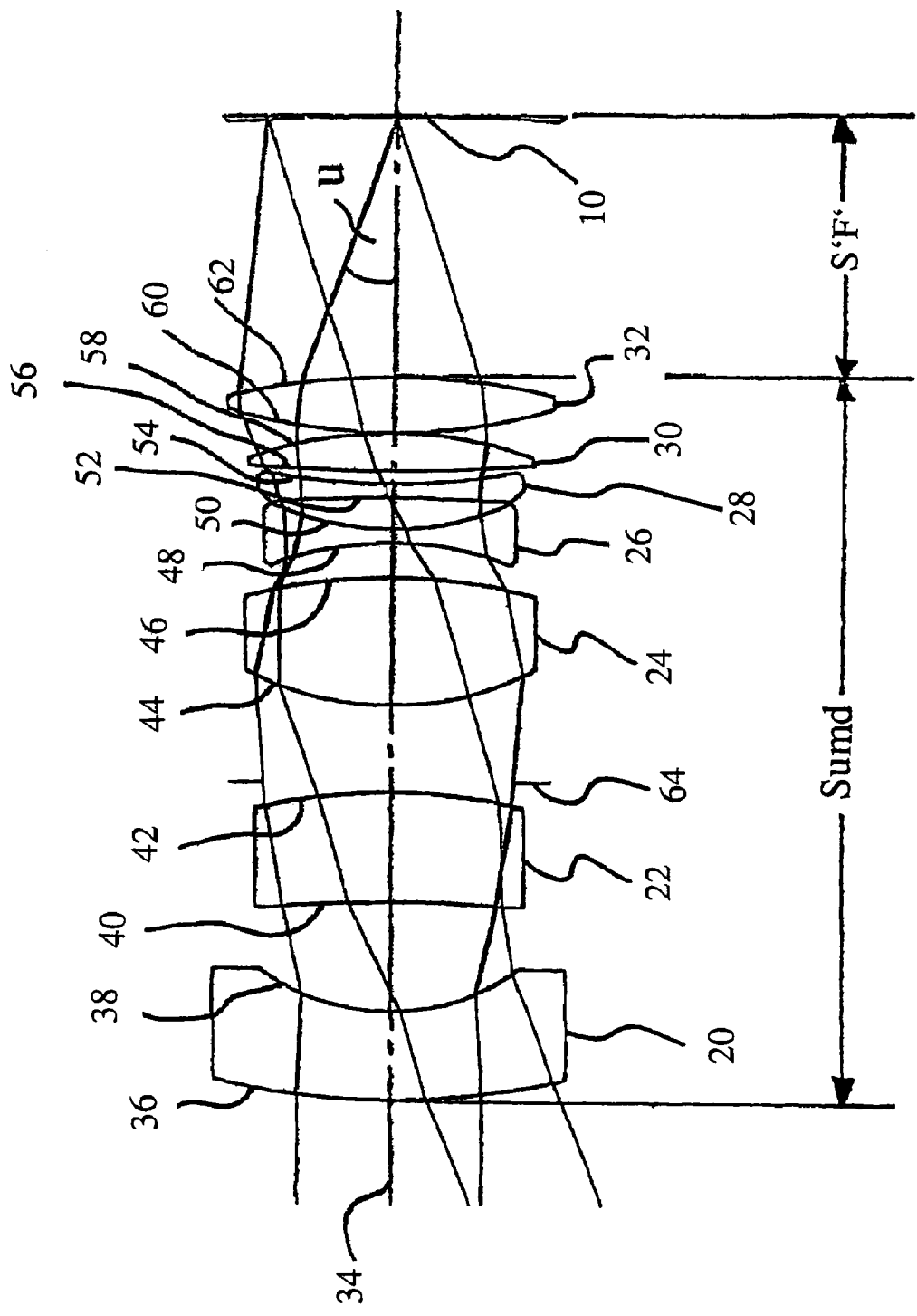
FIG. 2 shows a lens arrangement of a first exemplary embodiment of a high-aperture cinema projection objective with a focal length of 35 mm.
Figure 10:
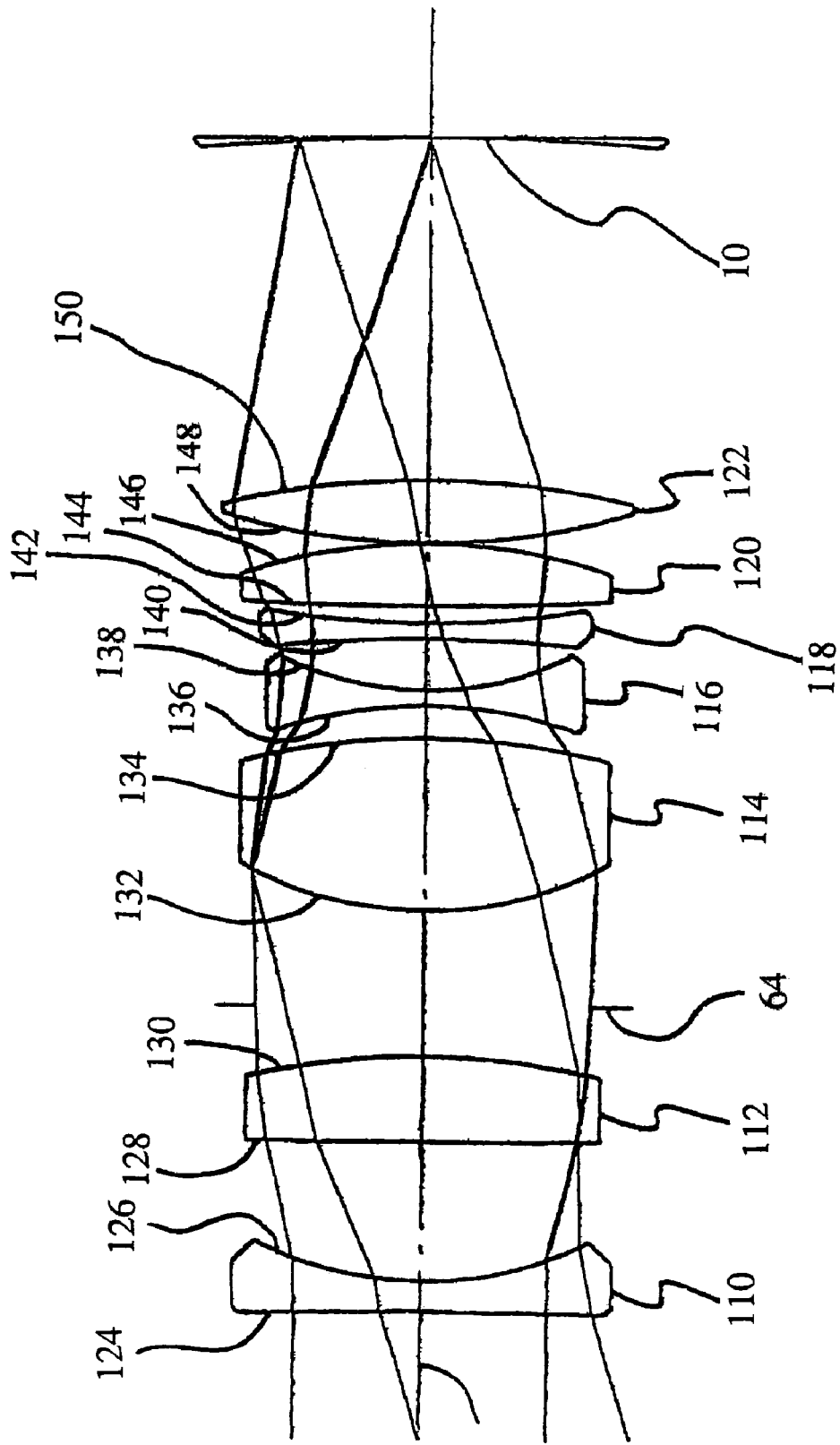
FIG. 10 shows a lens arrangement of a second exemplary embodiment of a high-aperture cinema projection lens with a focal lens of 47.5 mm.
Figure 11:
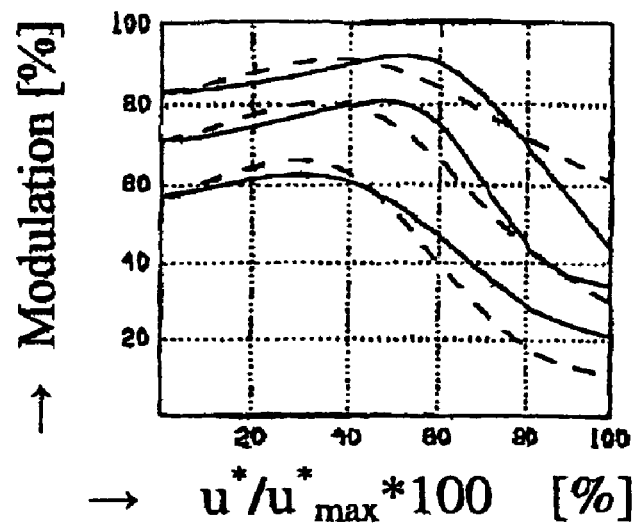
FIG. 11 shows the resolution of the cinema projection lens in accordance with FIG. 10 for a stop number k of 1.8.
Figure 12:
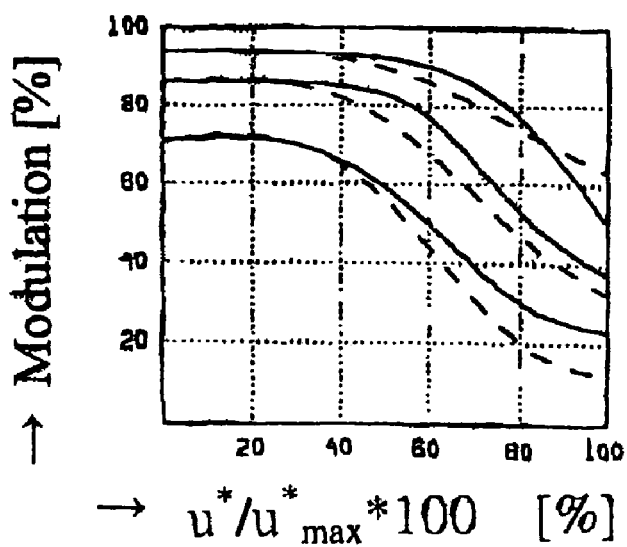
FIG. 12 shows the resolution of the cinema projection lens in accordance with FIG. 10 for a stop number k of 2.0.
Figure 13:
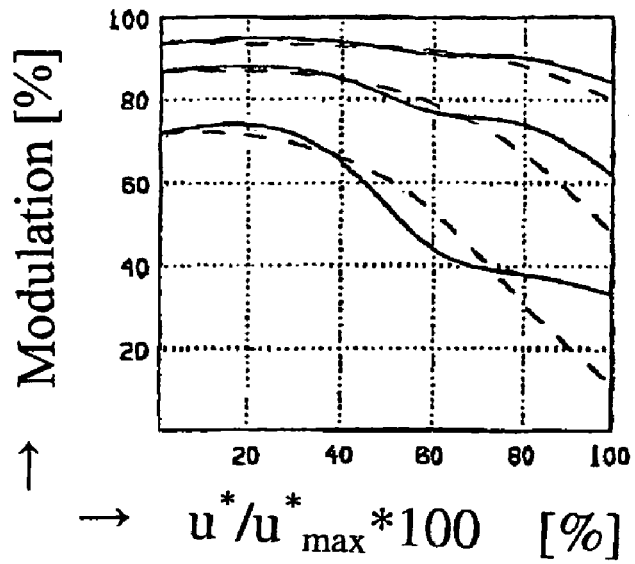
FIG. 13 shows the resolution of the cinema projection lens in accordance with FIG. 10 for a stop number k of 2.8.
Figure 14:
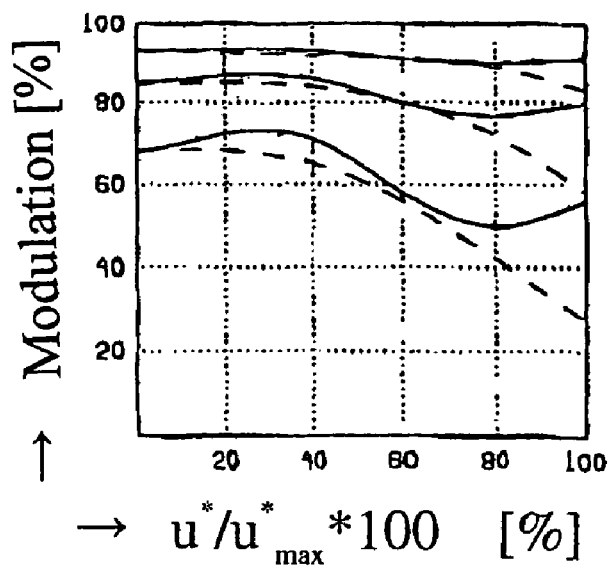
FIG. 14 shows the resolution of the cinema projection lens in accordance with FIG. 10 for a stop number k of 4.0.

In detail:

Table 1 shows the technical data of the first exemplary embodiment, illustrated in FIG. 2, of a cinema projection lens with a focal length of 35 mm;

Table 2 shows the asphere co-efficients of the surface, facing the diaphragm, of the second positive lens of the cinema projection lens in accordance with FIG. 2;

Table 3 shows the technical data of the second exemplary embodiment, illustrated in FIG. 10, of a cinema projection lens with a focal length of 47.5 mm; and Table 4 shows the asphere co-efficients of the surface, facing the diaphragm, of the second positive lens of the cinema projection lens in accordance with FIG. 10.

DETAILED DESCRIPTION

Figure 1:
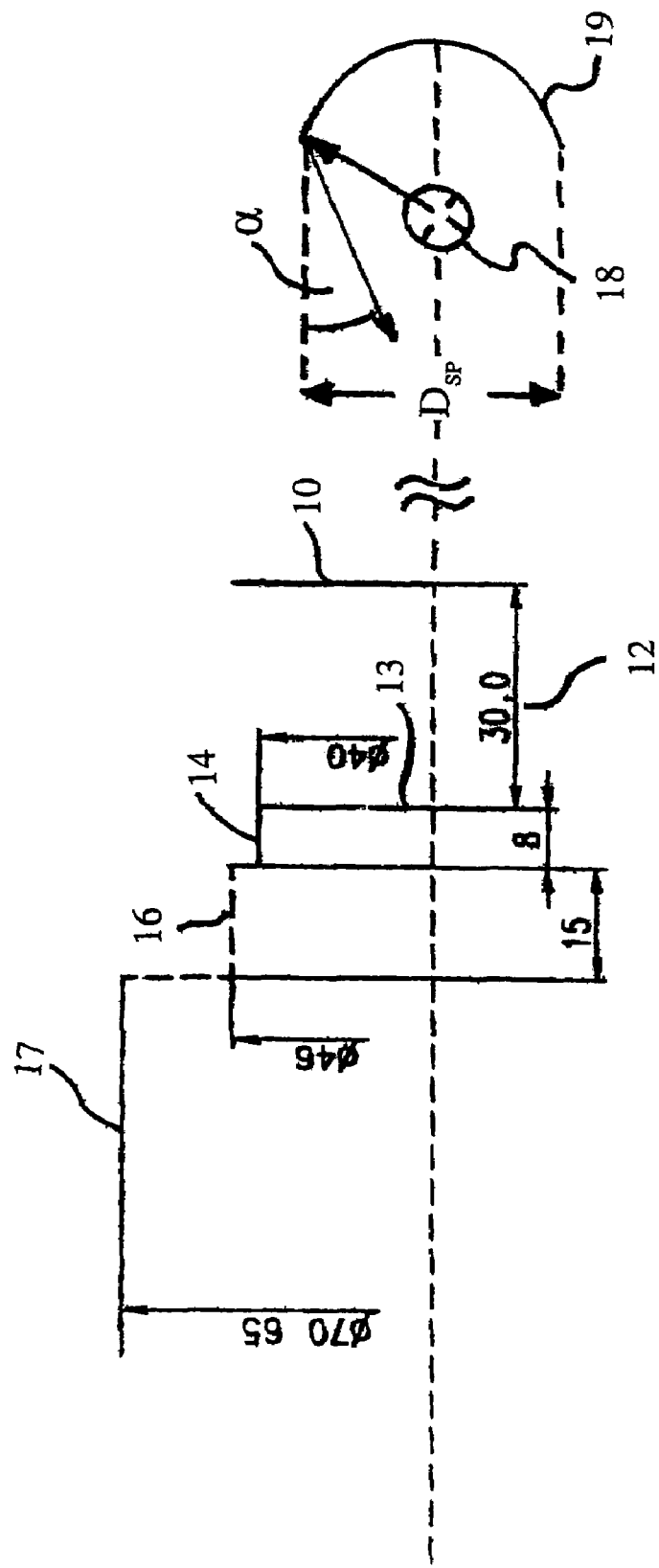
FIG. 1 shows installation conditions prescribed by the projection lens housings of different manufacturers of cinema projection lenses, and the dimensions of an illuminating mirror.

FIG. 1 illustrates boundary curves of the projection lens housings of two widespread cinema projectors (Ernemann Cine Tec GmbH and Fa. Kinoton GmbH) as an example of typical installation conditions of projection lenses. Starting from the film plane 10, a first lens system with a maximum edge diameter 14 of 40 mm and a total thickness of 8 mm can be arranged at the distance of the back focus S'F' (denoted by 12 in FIG. 1). A second lens system with a maximum edge diameter 16 of 46 mm and a total thickness of 15 mm can be arranged downstream thereof. A third lens system can have an edge diameter 17 of 70.65 mm at most. A projection lens is optimally configured such that the lens system fulfils the installation conditions of both manufacturers.

Furthermore, FIG. 1 also illustrates the opening angle α of the light cone of the light emitted by the light source 18 and reflected by the illuminating mirror 19. By analogy with the stop number of the projection lens, the stop number $k_{SP}$ for the illuminating mirror is defined as the ratio between the focal length $f_{SP}$ (not depicted in FIG. 1) and the diameter $D_{SP}$ of the mirror.

FIRST EXEMPLARY EMBODIMENT

FIG. 2 shows the principle of the design of a projection lens in accordance with a first exemplary embodiment. This is a projection lens with a focal length of 35 mm and a minimum stop number of 1.7.

In the illustration in accordance with FIG. 2, the projection screen is located on the left, and the film plane 10 on the right. The projection lens in accordance with the first exemplary embodiment comprises the following elements in the sequence from left to right:

a first negative lens in the form of a meniscus lens 20,
a second positive lens in the form of a meniscus lens 22,
a third positive lens in the form of a biconvex lens 24,
a fourth negative lens in the form of a biconcave lens 26,
a fifth negative lens in the form of a biconcave lens 28,
a sixth positive lens in the form of a biconvex lens 30, and
a seventh positive lens in the form of a biconvex lens 32.

The optical axis is denoted by 34. A diaphragm 64 is arranged between the second positive lens 22 and the third positive lens 24.

The precise data on the individual surfaces of the optical elements are to be found in Table 1 together with the respectively associated reference numerals.

The dispersion in the form of an Abbé number $v_d$ in Table 1 is defined as $$v_d = \frac{n_d - 1}{n_{F'} - n_{C'}}, \qquad (6)$$

$n_{F'}$ being the refractive index at 480 nm, $n_{C'}$ being the refractive index at 643.8 nm, and $n_d$ being the refractive index at 588 nm.

The second positive lens 22 has an aspheric surface on the surface 42 facing the diaphragm 64. The surface of an aspheric lens can be described in general with the aid of the following formula:

$$z = \frac{Cy^2}{1 + \sqrt{1 - (1+K)C^2 y^2}} + A_4 y^4 + A_6 y^6 + A_8 y^8 + A_{10} y^{10} \qquad (7)$$

where z specifies the sagitta (in mm) with reference to the plane perpendicular to the axis, that is to say the direction of the deviation from the plane perpendicular to the optical axis, that is to say in the direction of the optical axis.

C specifies the so-called vertex curvature. It serves to describe the curvature of a convex or concave lens surface.

y specifies the distance from the optical axis (in mm). y is a radial co-ordinate.

K specifies the so-called cone constant.

$A_4$, $A_6$, $A_8$, $A_{10}$ represent the so-called aspheric co-efficients, which are the co-efficients of a polynomial expansion of the function for describing the surface of the asphere.

The aspheric co-efficients of the surface 42 are listed in Table 2.

With the diaphragm open, the specified projection lens has a stop number of 1.7. It is therefore also possible for ultra high-aperture illuminating mirrors with an aperture angle of up to approximately 17° to be used as light source and to operate efficiently.

The resolution and the imaging properties of the projection lens in accordance with the first exemplary embodiment are explained below in more detail with the aid of a few figures.

Figure 3:
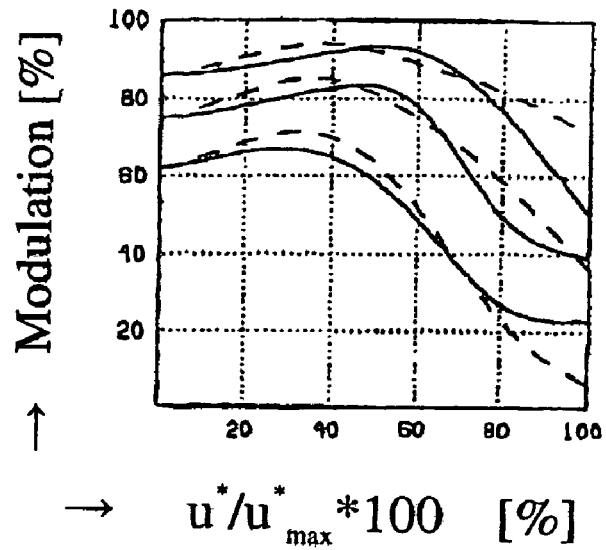
FIG. 3 shows the resolution of the cinema projection lens in accordance with FIG. 2 for a stop number k of 1.8.

FIG. 3 shows the resolution of the projection lens in accordance with the first exemplary embodiment. When optimizing the various aberrations, it is necessary when correcting the field curvature to take account of the film curvature of 0.1 to 0.15 mm in the direction of the projection lens, which is caused by the intense development of heat by the projection lamp and occurs at the edge. The modulation transfer functions illustrated are calculated for such a curved film.

The resolution was calculated for a colour weighting which corresponds to the average sensitivity of the human eye. Three examples were calculated: the upper two curves refer to the example with a spatial frequency of 20 line pairs per mm (LP/mm), the middle two curves relate to 40 LP/mm, and the lower two curves relate to 80 LP/mm. The continuous line respectively shows the resolution of radially running line pairs, and the dashed line the resolution of tangentially running line pairs. The x-axis specifies the relative deviation from the centre of the image to be enlarged. The modulation transfer function for a stop number k of 1.7 is illustrated on the y-axis. The imaging was performed to infinity, as it were. The resolution of the projection lens in accordance with the first exemplary embodiment corresponds to the resolution of very good projection lenses.

Figure 4:
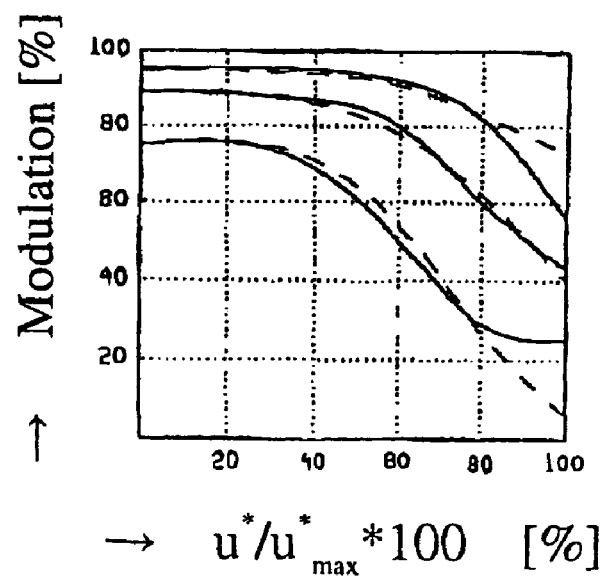
FIG. 4 shows the resolution of the cinema projection lens in accordance with FIG. 2 for a stop number k of 2.0.
Figure 5:
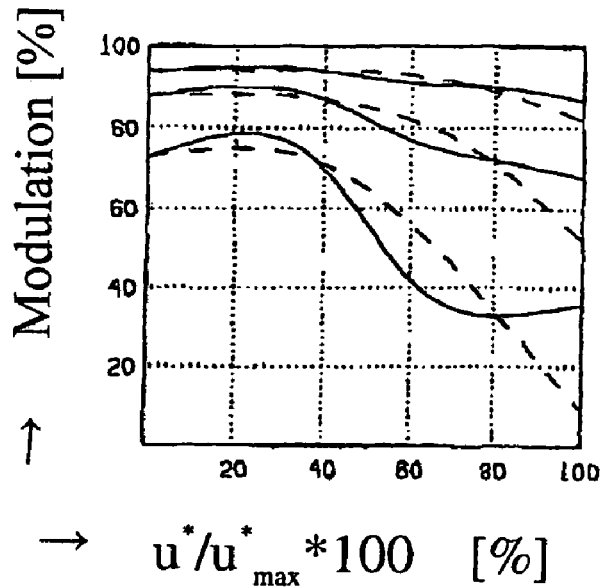
FIG. 5 shows the resolution of the cinema projection lens in accordance with FIG. 2 for a stop number k of 2.8.
Figure 6:
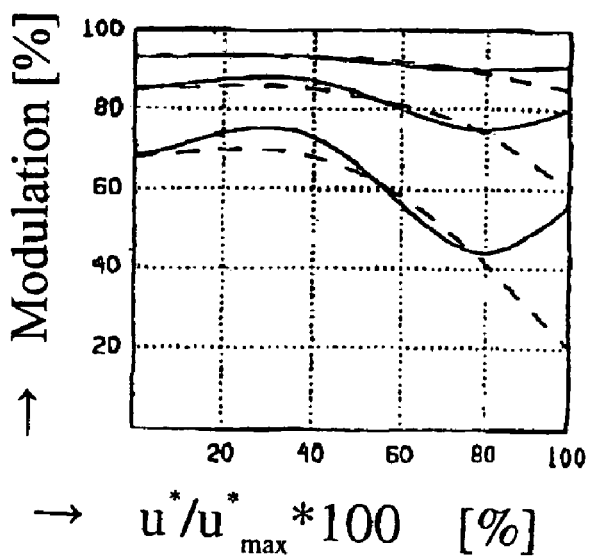
FIG. 6 shows the resolution of the cinema projection lens in accordance with FIG. 2 for a stop number k of 4.0.

FIGS. 4 to 6 show the resolution of the projection lens in accordance with the first exemplary embodiment for the case of a partially closed diaphragm:

FIG. 4: Diaphragm 2.0
FIG. 5: Diaphragm 2.8,
FIG. 6: Diaphragm 4.0.

Otherwise, FIGS. 4 to 6 correspond to FIG. 3.

Figure 7:
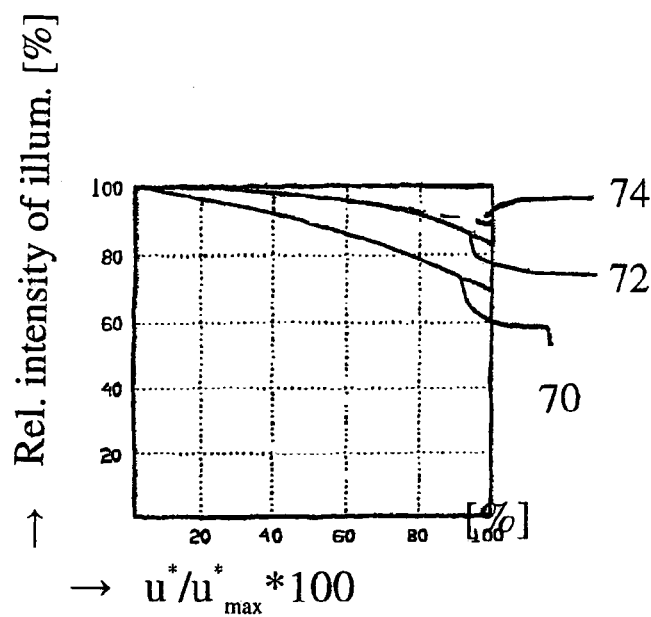
FIG. 7 shows the relative intensity of illumination of the cinema projection lens in accordance with FIG. 2 for a stop number k of 1.8, 2.0, and 2.4.

FIG. 7 shows the relative intensity of illumination of the edges of the large image compared with the centre for the projection lens in accordance with the first exemplary embodiment. The x-axis corresponds to the x-axis in accordance with FIG. 3. The lowermost curve 70 was calculated for a stop number of k=1.7, the middle curve 72 for k=2.0, and the uppermost curve 74 for k=2.8 and 4.0.

Figure 8:
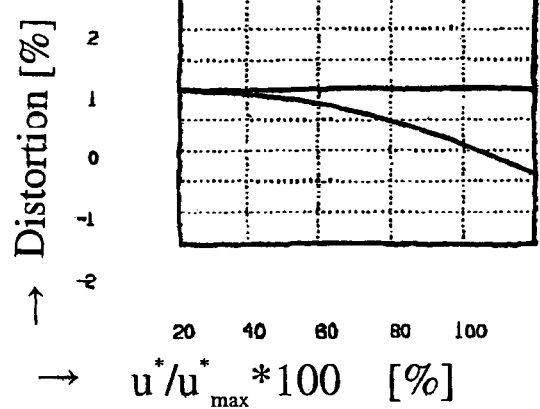
FIG. 8 shows the distortion of the cinema projection lens in accordance with FIG. 2.

FIG. 8 shows the distortion for the projection lens in accordance with the first exemplary embodiment in % of a deviation from the ideal image size. A slight barrel-shaped distortion is in evidence, but it is small by comparison with conventional wide-angle projection lenses.

Figure 9:
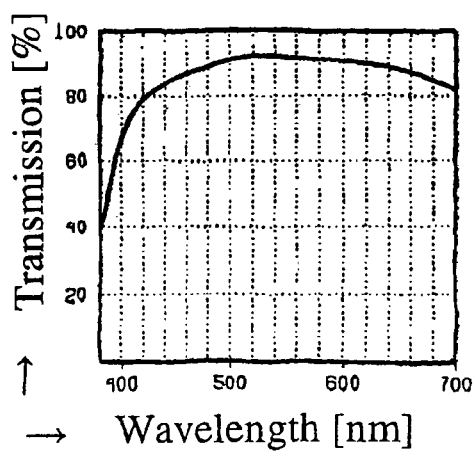
FIG. 9 shows the transmission of the cinema projection lens in accordance with FIG. 2.

FIG. 9 illustrates the transmission in % for the projection lens in accordance with FIG. 2 for the wavelength region between 400 nm and 700 nm. The cinema projection lens has tolerable losses in the visible wavelength region.

The cinema projection lens in accordance with the first exemplary embodiment has a back focus S'F' of 31.898 mm. The overall length Sumd of the overall projection lens is 90.647 mm. The sum of overall length and back focus is therefore 122.545 mm and is consequently greater than 2.8 f' (98 mm) and smaller than 4.5 f' (157.5 mm). It follows that the condition (3) specified is fulfilled.

The entrance pupil is 119.87 mm to the left of the lens surface 62, and so the condition placed on the position of the entrance pupil is also fulfilled.

SECOND EXEMPLARY EMBODIMENT

FIG. 10 shows the principle of the design of a cinema projection lens in accordance with a second exemplary embodiment. This is a projection lens with a focal length of 47.5 mm and a stop number of k=1.7.

Once again, the projection screen is to the left, and the film plane 10 to the right. The projection lens comprises the following elements in sequence from left to right:

a first negative lens in the form of a biconcave lens 110,
a second positive lens in the form of a biconvex lens 112,
a third positive lens in the form of a biconvex lens 114,
a fourth negative lens in the form of a biconcave lens 116,
a fifth negative lens in the form of a biconcave lens 118,
a sixth positive lens in the form of a biconvex lens 120,
a seventh positive lens in the form of a biconvex lens 122.

A stop 64 is again arranged between the second positive lens 112 and the third positive lens 114. The precise data on the individual surfaces of the optical elements are to be found in Table 3 together with the respectively associated reference numerals.

The face 130 of the lens 112, which faces the stop 64, is once again configured as an aspheric surface. The aspheric co-efficients of this surface 130 are set forth in Table 4.

With the stop open, the projection lens specified in the second exemplary embodiment also has a stop number of 1.7, and so it is possible once again to use ultra high-aperture illuminating mirrors.

Figure 15:
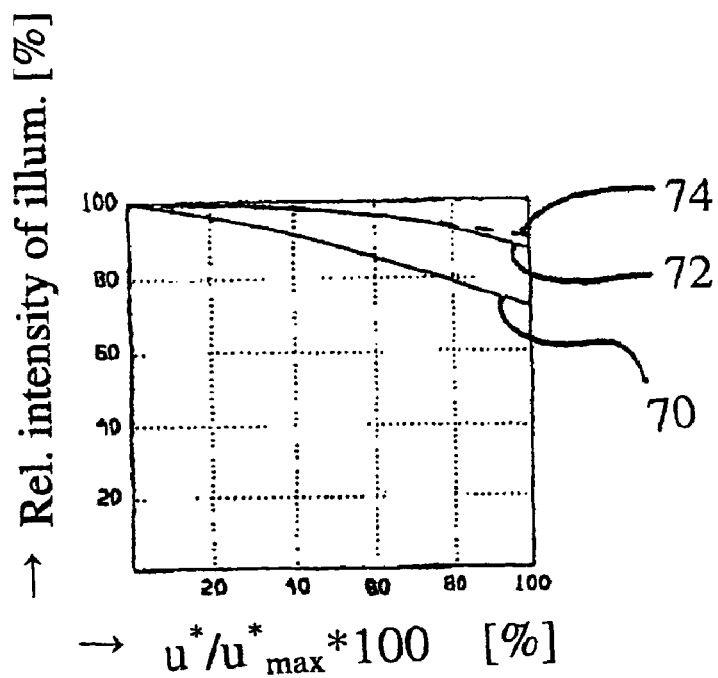
FIG. 15 shows the relative intensity of illumination of the cinema projection lens in accordance with FIG. 10 for a stop number k of 1.8.
Figure 16:
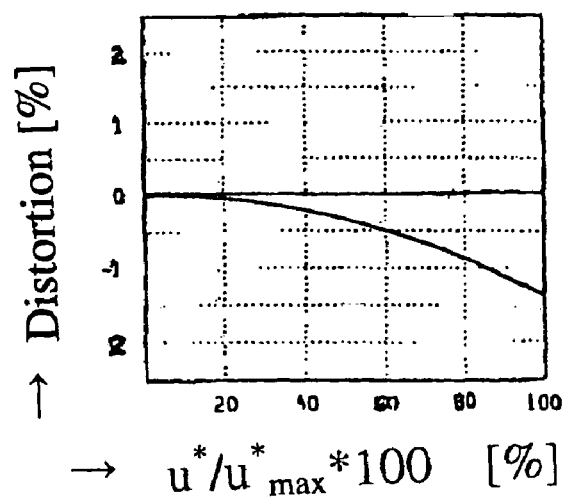
FIG. 16 shows the distortion of the cinema projection lens in accordance with FIG. 10.
Figure 17:
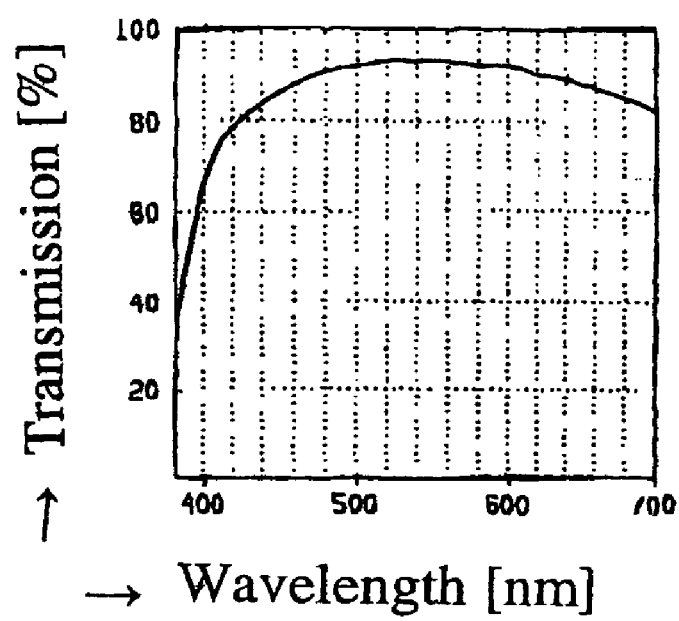
FIG. 17 shows the transmission of the cinema projection lens in accordance with FIG. 10.

FIGS. 11 to 14 correspond to FIGS. 3 to 6 of the first exemplary embodiment, and show the resolution of the projection lens in accordance with the second exemplary embodiment for apertures k of 1.7, 2.0, 2.8 and 4.0. FIGS. 15 to 17 correspond to FIGS. 7 to 9 of the first exemplary embodiment, and once again show the relative intensity of illumination, the distortion and the transmission of the cinema projection lens in accordance with the second exemplary embodiment.

The cinema projection lens in accordance with the second exemplary embodiment has a back focus S'F' 12 of 40.002 mm and an overall length Sumd of 101.943 mm. The sum of back focus and overall length is therefore 141.945 mm and is consequently greater than 2.8 f' (133 mm) and smaller than 4.5 f' (213.75 mm). The condition specified above is therefore fulfilled by the projection lens in accordance with the second exemplary embodiment.

The entrance pupil is 233.521 mm to the left of the last lens surface 150, and so the condition placed on the position of the entrance pupil is also fulfilled by the projection lens in accordance with the second exemplary embodiment.

TABLE 1

| Reference numeral | Radius/mm | Thickness or distance/mm | Free diameter/mm | Refractive index ($n_d$) at 588 nm | Dispersion ($v_d$) at 588 nm |
|---|---|---|---|---|---|
| 36 | 76.068 | | 36.100 | | |
| 20 | | 10.521 | | 1.51680 | 64.14 |

TABLE 1-continued

| Reference numeral | Radius/mm | Thickness or distance/mm | Free diameter/mm | Refractive index ($n_d$) at 588 nm | Dispersion ($v_d$) at 588 nm |
|---|---|---|---|---|---|
| 38 | 21.464 | | 26.800 | | |
| | | 13.354 | | | |
| 40 | −126.324 | | 24.500 | | |
| 22 | | 13.711 | | 1.72916 | 54.65 |
| 42 | −52.802* | | 26.600 | | |
| | | 5.000 | | | |
| 64 | (Diaphragm) | | | | |
| | | 6.089 | | | |
| 44 | 29.103 | | 29.000 | | |
| 24 | | 16.346 | | 1.64050 | 60.15 |
| 46 | −51.643 | | 27.200 | | |
| | | 4.476 | | | |
| 48 | −29.981 | | 24.800 | | |
| 26 | | 1.800 | | 1.59270 | 35.30 |
| 50 | 26.691 | | 24.800 | | |
| | | 4.000 | | | |
| 52 | −153.321 | | 24.800 | | |
| 32 | | 1.800 | | 1.80809 | 22.75 |
| 54 | 63.875 | | 26.400 | | |
| | | 1.650 | | | |
| 56 | 169.672 | | 27.500 | | |
| 30 | | 4.800 | | 1.64050 | 60.15 |
| 58 | −38.663 | | 28.500 | | |
| | | 0.100 | | | |
| 60 | 53.566 | | 32.800 | | |
| 32 | | 7.000 | | 1.75500 | 52.30 |
| 62 | −67.549 | | 33.000 | | |

(*= Aspheric surface)

TABLE 2

| | | |
|---|---|---|
| C | 0.018939 | |
| K | 0.000000 | 35 |
| $A_4$ | $-0.531052 * 10^{-6}$ | |
| $A_6$ | $0.523980 * 10^{-9}$ | |
| $A_8$ | $-0.131713 * 10^{-10}$ | |
| $A_{10}$ | $0.319473 * 10^{-13}$ | |

TABLE 3

| Reference numeral | Radius/mm | Thickness or distance/mm | Free diameter/mm | Refractive index ($n_d$) at 588 nm | Dispersion ($v_d$) at 588 nm |
|---|---|---|---|---|---|
| 124 | −784.753 | | 38.300 | | |
| 110 | | 3.500 | | 1.51880 | 64.14 |
| 126 | 37.095 | | 34.700 | | |
| | | 16.090 | | | |
| 128 | 1219.347 | | 33.500 | | |
| 112 | | 10.160 | | 1.732916 | 54.65 |
| 130 | −73.026* | | 35.400 | | |
| | | 6.000 | | | |
| 64 | (Blende) | | | | |
| | | 11.797 | | | |
| 132 | 35.655 | | 37.000 | | |
| 114 | | 21.730 | | 1.644050 | 60.15 |
| 134 | −66.489 | | 33.800 | | |
| | | 4.056 | | | |
| 136 | −42.288 | | 31.300 | | |
| 116 | | 2.000 | | 1.59270 | 35.30 |
| 138 | 28.976 | | 30.200 | | |
| | | 6.480 | | | |
| 140 | −142.587 | | 31.100 | | |
| 118 | | 2.000 | | 1.80809 | 22.75 |
| 142 | 85.779 | | 33.000 | | |
| | | 2.160 | | | |
| 144 | 352.026 | | 34.600 | | |

TABLE 3-continued

| Reference numeral | Radius/mm | Thickness or distance/mm | Free diameter/mm | Refractive index ($n_d$) at 588 nm | Dispersion ($v_d$) at 588 nm |
|---|---|---|---|---|---|
| 120 | | 7.570 | | 1.64050 | 60.15 |
| 146 | −52.233 | | 37.000 | | |
| | | 0.100 | | | |
| 148 | 65.539 | | 41.300 | | |
| 122 | | 8.300 | | 1.75500 | 52.30 |
| 150 | −81.787 | | 41.400 | | |

(*= Aspheric surface)

TABLE 4

| C | −0.013694 |
|---|---|
| K | 0.000000 |
| $A_4$ | $0.601508 * 10^{-7}$ |
| $A_6$ | $0.565724 * 10^{-9}$ |
| $A_9$ | $-0.223813 * 10^{-11}$ |
| $A_{10}$ | $0.330861 * 10^{-14}$ |

REFERENCE NUMERALS

10 Film plane
12 Back focus S'F'
13 First plane
14 Maximum edge diameter of a first lens system
16 Maximum edge diameter of a second lens system
17 Maximum edge diameter of a third lens system
18 Light source
19 Illuminating mirror
20 First negative lens in the form of a meniscus lens
22 Second positive lens
24 Third positive lens in the form of a biconvex lens
26 Fourth negative lens in the form of a biconcave lens
28 Fifth negative lens in the form of a biconcave lens
30 Sixth positive lens in the form of a biconvex lens
32 Seventh positive lens in the form of a biconvex lens
34 Optical axis
36 First surface of the lens 20
38 Second surface of the lens 20
40 First surface of the lens 22
42 Second surface of the lens 22
44 First surface of the lens 24
46 Second surface of the lens 24
48 First surface of the lens 26
50 Second surface of the lens 26
52 First surface of the lens 28
54 Second surface of the lens 28
56 First surface of the lens 30
58 Second surface of the lens 30
60 First surface of the lens 32
62 Second surface of the lens 32
64 Diaphragm
70 Relative intensity of illumination for an aperture of 1.8
72 Relative intensity of illumination for an aperture of 2.0
74 Relative intensity of illumination for an aperture of 2.8
110 First negative lens of the second exemplary embodiment
112 Second positive lens of the second exemplary embodiment
114 Third positive lens of the second exemplary embodiment
116 Fourth negative lens of the second exemplary embodiment
118 Fifth negative lens of the second exemplary embodiment
120 Sixth positive lens of the second exemplary embodiment
122 Seventh positive lens of the second exemplary embodiment
124 First surface of the lens 110
126 Second surface of the lens 110
128 First surface of the lens 112
130 Second surface of the lens 112
132 First surface of the lens 114
134 Second surface of the lens 114
136 First surface of the lens 116
138 Second surface of the lens 116
140 First surface of the lens 118
142 Second surface of the lens 118
144 First surface of the lens 120
146 Second surface of the lens 120
148 First surface of the lens 122
150 Second surface of the lens 122

The invention claimed is:

1. A projection lens which is suitable for projecting a film onto a projection screen and which has the following elements when viewed from the projection screen in the specified sequence:
    a first negative lens;
    a second positive lens;
    a third biconvex lens;
    a fourth biconcave lens;
    a fifth biconcave lens;
    a sixth biconvex lens; and
    a seventh biconvex lens;
        in which the total focal length f' of the lens satisfies the condition 28 mm≦f'≦47.5 mm; and in which the smallest stop number k of the projection lens is 1.8 or less.

2. A projection lens according to claim 1, in which at least one lens has an aspheric surface.

3. A projection lens according to claim 2, in which the surface of the second positive lens which faces the third biconvex lens is configured as an aspheric surface.

4. A projection lens according to claim 2, in which the aspheric surface deviates from a spherical surface by not more than 10 µm.

5. A projection lens according to claim 1, wherein the first negative lens is arranged on the projection screen side, and the seventh biconvex lens is arranged on the film side;

wherein the projection lens has an entrance pupil for a fictitious observer positioned on the film side; and wherein the entrance pupil is arranged on the projection screen side at a distance of between 100 mm and 300 mm from the lens surface of the projection lens which is arranged furthest on the film side.

6. A projection lens according to claim 1, wherein the spatial dimensions of the projection lens are designed in such a way that it can be installed for operating purposes in a space having the following dimensions:

the space is designed to be rotationally symmetrical about the optical axis;

the space starts in a first plane, which is designed perpendicular to the optical axis and is arranged at a distance of 30 mm from the film plane;

on the projection screen side the first plane is adjoined by a first cylindrical volume with a diameter of 40 mm and a height of 8 mm;

the first cylindrical volume is adjoined on the projection screen side by a second cylindrical volume with a diameter of 46 mm and a height of 15 mm; and the second cylindrical volume is adjoined on the projection screen side by a third cylindrical volume with a diameter of 70.65 mm.

7. A projection lens according to claim 1, wherein said projection lens is designed in such a way that the following condition is fulfilled between the overall length Sumd, the back focus S'F' and the total focal length f' of the projection lens:

$$2.8f' < Sumd + S'F' < 4.5f'.$$

8. A projection lens according to claim 1, further including a diaphragm between the second positive lens and the third biconvex lens.

9. A series of projection lenses according to claim 1 with different focal lengths f', wherein at least 2 projection lenses of different focal length have at least one lens which corresponds with regard to material thickness, and radii of curvature and/or shape of the aspheric surface.

* * * * *